(12) United States Patent
Moriguchi et al.

(10) Patent No.: US 12,332,536 B2
(45) Date of Patent: Jun. 17, 2025

(54) OPTICAL SCANNER

(71) Applicant: DENSO CORPORATION, Kariya (JP)

(72) Inventors: Chihiro Moriguchi, Kariya (JP); Yuichi Toyota, Kariya (JP); Taro Beppu, Kariya (JP); Hikaru Sasaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 268 days.

(21) Appl. No.: 18/191,355

(22) Filed: Mar. 28, 2023

(65) Prior Publication Data

US 2023/0236472 A1 Jul. 27, 2023

Related U.S. Application Data

(63) Continuation of application No. PCT/JP2021/034109, filed on Sep. 16, 2021.

(30) Foreign Application Priority Data

Sep. 30, 2020 (JP) .................................. 2020-165998

(51) Int. Cl.
*H04B 10/11* (2013.01)
*G02B 26/10* (2006.01)
*G02F 1/29* (2006.01)

(52) U.S. Cl.
CPC ........... *G02F 1/292* (2013.01); *G02B 26/106* (2013.01); *H04B 10/11* (2013.01)

(58) Field of Classification Search
None
See application file for complete search history.

(56) References Cited

U.S. PATENT DOCUMENTS

| 9,476,981 B2 * | 10/2016 | Yaacobi ................. G01S 17/931 |
| 10,382,140 B2 * | 8/2019 | Fatemi ................... H04B 10/11 |
| 11,782,220 B2 * | 10/2023 | Frisken ................. G02B 6/3512 |
| | | 359/207.8 |
| 11,994,625 B2 * | 5/2024 | Lee ......................... G01S 7/4865 |
| 2019/0243000 A1 * | 8/2019 | Shim ...................... G01S 17/931 |
| 2020/0158839 A1 * | 5/2020 | Lin .......................... G01C 25/00 |

* cited by examiner

*Primary Examiner* — Jai M Lee
(74) *Attorney, Agent, or Firm* — Maschoff Brennan

(57) ABSTRACT

An optical scanner includes a light receiving unit, a reference light irradiating unit, and a light-receiving-side correcting unit. The light receiving unit includes an optical phased array that implements scanning by a light beam by individually controlling phases of a plurality of branched lights using a scanning phase amount. The reference light irradiating unit generates reference light and irradiate the reference light onto the light receiving unit. The light-receiving-side correcting unit estimates a phase shift amount that occurs in the plurality of branched lights as a result of distortion of a substrate on which the light receiving unit is mounted from a detection result of the light receiving unit onto which the reference light is incident, and sets a phase adjustment amount to be applied to the plurality of branched lights such that the estimated phase shift amount decreases.

20 Claims, 15 Drawing Sheets

OPTICAL SCANNER

CROSS-REFERENCE TO RELATED APPLICATION

The present application is a continuation application of International Application No. PCT/JP2021/034109, filed on Sep. 16, 2021, which claims priority to Japanese Patent Application No. 2020-165998, filed on Sep. 30, 2020. The contents of these applications are incorporated herein by reference in their entirety.

BACKGROUND

Technical Field

The present disclosure relates to an optical scanner that uses an optical phased array.

Related Art

A technology in which beamforming and beam steering are performed through use of an optical phased array is known. In the optical phased array, an antenna array that has a plurality of antenna elements that radiate light is used, and respective phase shift amounts that are provided to the antenna elements are controlled.

SUMMARY

One aspect of the present disclosure provides an optical scanner that includes a light receiving unit, a reference light irradiating unit, and a light-receiving-side correcting unit. The light receiving unit includes an optical phased array that implements scanning by a light beam by individually controlling phases of a plurality of branched lights using a scanning phase amount. The reference light irradiating unit generates reference light and irradiates the reference light onto the light receiving unit. The light-receiving-side correcting unit estimates a phase shift amount that occurs in the plurality of branched lights as a result of distortion of a substrate on which the light receiving unit is mounted from a detection result of the light receiving unit onto which the reference light is incident, and sets a phase adjustment amount to be applied to the plurality of branched lights such that the estimated phase shift amount decreases.

DESCRIPTION OF THE EMBODIMENTS

Figure 1:
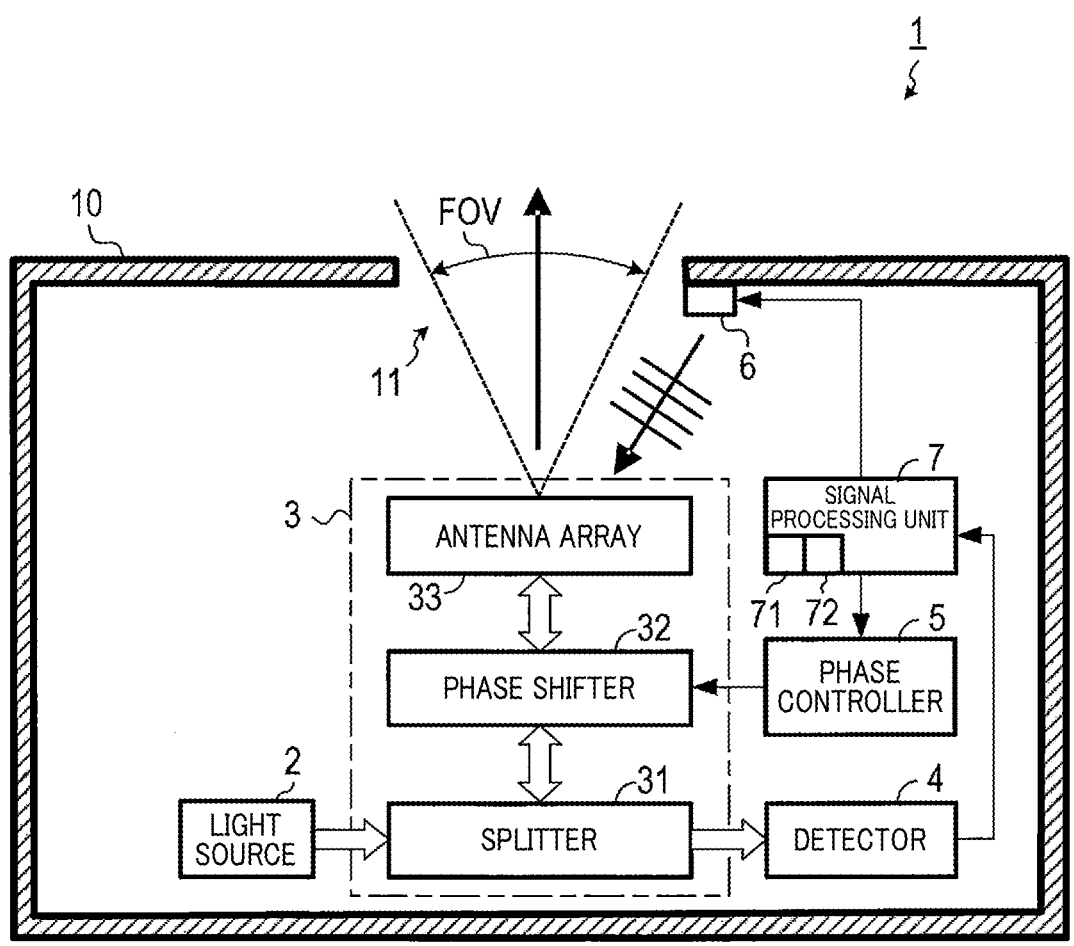
FIG. 1 is a block diagram of a configuration of an optical scanner according to a first embodiment.

In the optical phased array, the phase shift amounts that are provided to the antenna elements for beam steering are theoretically uniquely prescribed based on an arrangement of the antenna array and a wavelength of the light that is used. However, when characteristics of waveguides from a light source to the antenna elements change as a result of temperature changes and the like, errors occur in the phase shift amounts that are provided to the antenna elements. Required performance regarding a beam profile, an emission angle, and the like cannot be achieved.

US 2020/0158839 A1 proposes a technology in which a phase monitor that monitors a phase of light that is supplied to each individual antenna element is set. Feedback control of the phase of the light that passes through a waveguide that is connected to each antenna element is performed such that a monitor value coincides with a target value.

However, as a result of keen examination by the inventors, an issue has been found in that, in the conventional technology, errors that are attributed to distortion of a substrate that affects three-dimensional arrangement of the antenna elements cannot be addressed.

That is, the optical phased array is formed on a substrate that is referred to as a PIC. PIC is an abbreviation of Photonic Integrated Circuit. When the optical phased array is applied to an onboard LiDAR, distortion (such as curving) is assumed to occur in the PIC substrate as a result of a surrounding temperature environment and heat generation from other mounted components. LiDAR is an abbreviation of Light Detection and Ranging. When distortion of the substrate occurs, as a result of the arrangement of the antenna elements changing in a three-dimensional manner, collapse of the beam profile and shifting of a beam emission angle occur. However, the conventional technology is a technology in which the three-dimensional arrangement of the antenna elements is presumed to be fixed. Therefore, the conventional technology cannot address errors that are attributed to distortion of the substrate that affects the three-dimensional arrangement of the antenna elements.

According to an aspect of the present disclosure, it is desired to provide a technology for correcting errors based on changes in an arrangement of antenna elements in an optical scanner that uses an optical phased array.

An exemplary embodiment of the present disclosure provides an optical scanner that includes a light receiving unit, a reference light irradiating unit, and a light-receiving-side correcting unit.

The light receiving unit includes an optical phased array that is configured to implement scanning by a light beam by individually controlling phases of a plurality of branched lights using a scanning phase amount. The reference light irradiating unit estimates a phase shift amount that occurs in the plurality of branched lights as a result of distortion of a substrate on which the light receiving unit is mounted from a detection result of the light receiving unit onto which the reference light is incident, and sets a phase adjustment amount to be applied to the plurality of branched lights such that the estimated phase shift amount decreases.

As a result of the optical scanner that is configured in this manner, the reference light from the reference light irradiating unit that is provided outside the light receiving unit is used for calculation of the phase adjustment amount that is used for correction of a beam profile and a beam irradiation direction of the light receiving unit that has the optical phased array. Therefore, in addition to a phase shift amount that is attributed to internal factors such as characteristics between waveguides that transmit the plurality of branched lights differing, a phase shift amount that is attributed to external factors such as distortion of a PIC substrate on which the light receiving unit is mounted can be detected. Consequently, effects of both internal factors and external factors can be eliminated.

In addition, as a result of the optical scanner, effects substrate distortion accompanying temperature environment changes has on the beam profile and the beam irradiation direction can be suppressed. Consequently, the optical scanner can be applied to an onboard LiDAR or the like that is required to operate in harsh temperature environments.

Embodiments of the present disclosure will hereinafter be described with reference to the drawings.

1. First Embodiment

[1-1. Configuration]

An optical scanner 1 shown in FIG. 1 includes a light source 2, an optical phased array (hereinafter referred to as an OPA) 3, a detector 4, a phase controller 5, a reference light irradiating unit 6, and a signal processing unit 7.

The optical scanner 1 is housed in a housing 10 and irradiates light from an opening portion 11 that is formed in a front wall of the housing 10. The opening portion 11 is of a size that does not obstruct an FOV that is an angular range (that is, a scanning range) over which scanning is performed by a light beam that is irradiated from the OPA 3. FOV is an abbreviation of Field Of View.

The light source 2 is a device that generates laser light. Here, a frequency modulation (FM)-modulated continuous wave that has a 1.5-µm-band or a 1.3-µm-band wavelength is used.

The OPA 3 is a device that controls a cross-sectional shape (that is, a beam profile) and an irradiation direction of a light beam using diffraction and interference of light. The OPA 3 includes a splitter 31, a phase shifter 32, and an antenna array 33. The OPA 3 is mounted on a single PIC substrate together with the light source 2.

The splitter 31 distributes incident light from the light source 2 to a waveguide array that is configured by a plurality of waveguides. In addition, the splitter 31 generates mixed light in which incident light from the waveguide array is mixed. The mixed light enters the detector 4 together with the incident light from the light source 2.

The phase shifter 32 is provided in each of the plurality of waveguides that configure the waveguide array. The phase shifters 32 individually change a phase of light that passes through the waveguide by changing a refractive index of the waveguide using an electro-optic effect, a thermo-optic effect, and the like, based on an instruction from the phase controller 5.

The antenna array 33 has K (for example, K=about several hundred or several thousand) antenna elements (hereafter, elements) that are arranged at regular intervals. In the waveguide array, end portions on a side opposite a connection end to the splitter 31 may be used as individual elements.

The antenna array 33 irradiates light that is supplied from the waveguide array towards the FOV. The antenna array 33 also receives light that arrives from the FOV and supplies the received light to the waveguide array. Here, the antenna array 33 may be configured to perform irradiation and reception of light through a diffraction grating that enables diffraction and interference of light.

Figure 2:
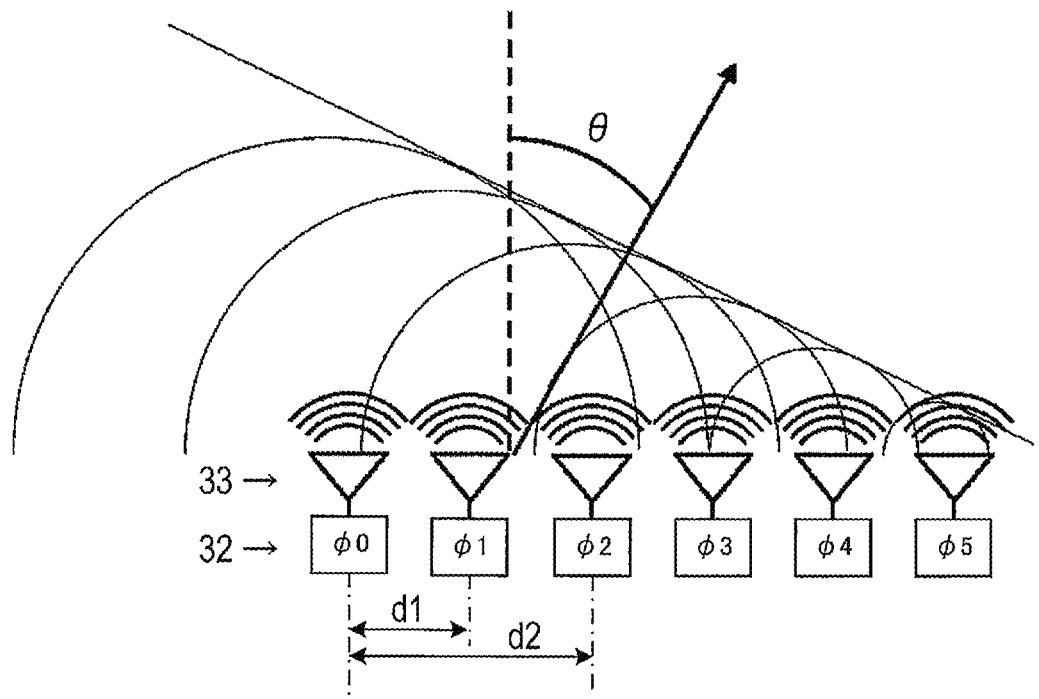
FIG. 2 is an explanatory diagram of a principle of an optical phased array.

As shown in FIG. 2, in the OPA 3, an electric field Ek in a direction θ as a result of radiation from an element that is identified by an identifier k is expressed by expression (1). Here, E0 is an electrical field amplitude and EF(θ) is an element factor that indicates a directivity (that is, an irradiation pattern) of an individual element. λ is a wavelength, θ is a radio wavefront propagation/arrival direction, dk is a distance of the element identified by k from a reference element, and φk is a phase that is provided to the element identified by k from the phase shifter 32. Here, the reference element is an element that is positioned in one end (such as a left end in FIG. 2) of the antenna array 33 and is expressed by k=0.

Hereafter, a value of k increases in order from that closest to the reference element.

$$E_k(\theta) = E_0 * EF(\theta)\exp\left(-i\frac{2\pi}{\lambda}d_k\sin\theta\right) \quad (1)$$

A composite electric field Esum(θ) that is generated by the overall antenna array 33 that has the K elements is expressed by expression (2). Here, AF(θ,λ) is an array factor that indicates a directivity of the overall antenna array 33 and is expressed by expression (3).

$$E_{sum}(\theta) = E_0 * AF(\theta, \lambda) \quad (2)$$

$$AF(\theta, \lambda) = EF(\theta)\sum_{k=0}^{K-1}\exp\left\{i\left(-\frac{2\pi}{\lambda}d_k\sin\theta + \phi_k\right)\right\} \quad (3)$$

Expression (4) is a phase conditional expression that is extracted from expression (3). A main lobe is formed in a direction θ0 that satisfies the phase conditional expression. That is, as a result of a phase φk being set to an appropriate value, the direction θ0 in which the main lobe is formed can be arbitrarily set. However, when m is an integer other than 0 and expression (5) is satisfied, a strong peak, that is, a grating lobe is also formed at an orientation θgm.

$$-\frac{2\pi}{\lambda}d_k\sin\theta_0 + \phi_k = 0 \quad (4)$$

$$-\frac{2\pi}{\lambda}d_k\sin\theta_{gm} + \phi_k = 2m\pi \quad (5)$$

Figure 3:
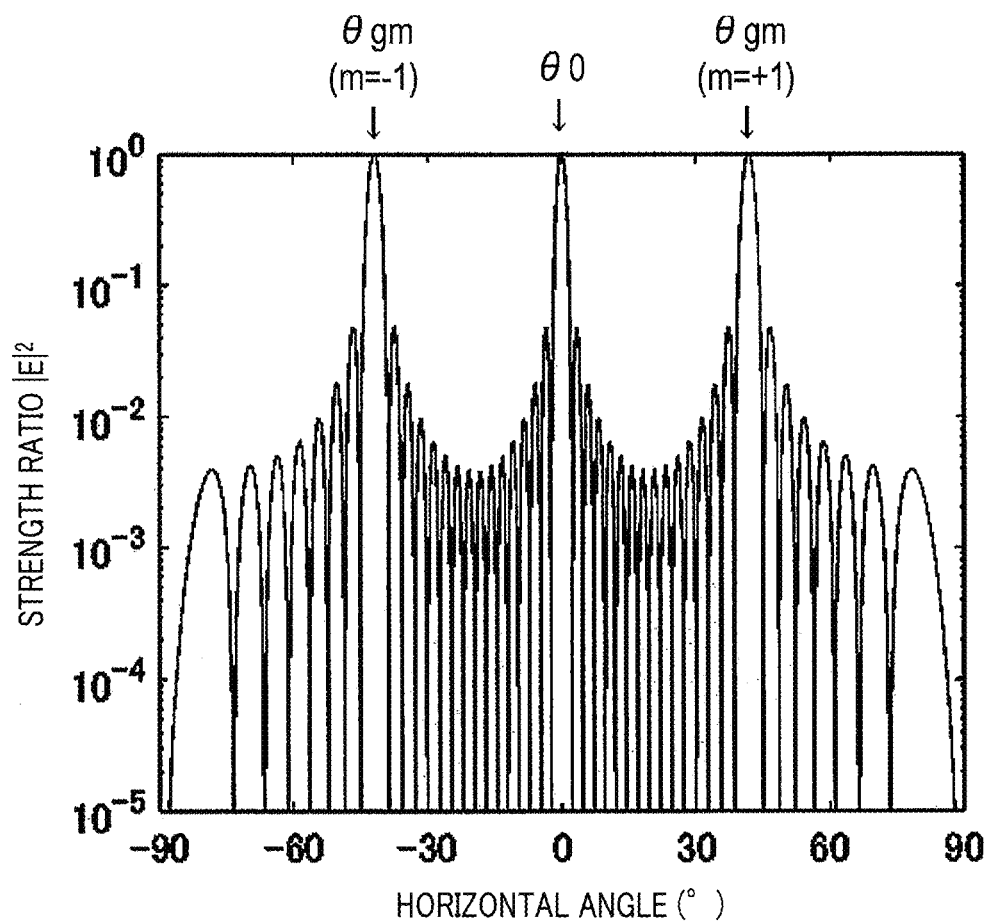
FIG. 3 is a graph of an irradiation pattern of the optical phased array.

Therefore, in the OPA 3, an irradiation pattern such as that shown in FIG. 3 is obtained. The FOV is typically set within a range that is centered around the direction θ0 in which the main lobe is formed and does not include the direction θgm in which a grating lobe of which m=±1 is formed. However, the FOV may be widened using the grating lobe in some cases and is therefore not limited to the above-described range.

The detector 4 is configured using a light receiving element such as a photodiode. The detector 4 converts mixed light that is generated by being received and mixed in the OPA 3 to an electrical signal, and supplies the electrical signal to the signal processing unit 7 as a light reception signal. The light reception signal is a beat signal that has a frequency component that is a difference between a transmission wave (that is, a reference wave) that is an FMCW wave and a reception wave.

The phase controller 5 implements scanning by a light beam by changing a scanning phase amount φ(θ) that is provided to the phase shifter 32 based on an irradiation direction θ of the light beam from the OPA 3. The scanning phase amount φ(θ) is a vector of which an element is phase shift amounts φ1 to φK that are set for each element of the antenna array 33. The scanning phase amount φ(θ) is a value that is theoretically prescribed based on an arrangement of the elements and the irradiation direction θ of the beam.

When an adjustment instruction is issued as a result of an instruction from the signal processing unit 7, the phase controller 5 provides the phase shifter 32 with an adjustment phase amount φ(θm), with a direction in which the reference light arrives from the reference light irradiating unit 6 as θm.

The phase controller 5 provides, to the phase shifter 32, a value that is the scanning phase amount φ(θ) or the adjustment phase amount φ(θm) corrected by a phase adjustment amount ψ supplied from the signal processing unit 7. The phase adjustment amount ψ is a vector of which an element is adjustment amounts $\psi_0$ to $\psi_{K-1}$ that are set for each element. The phase adjustment amount ψ is an adjustment amount for removing effects of phase shifting that occurs as a result of the arrangement of the antenna array 33 being three-dimensionally changed by distortion of the substrate on which the OPA 3 is mounted and the like.

As shown in FIG. 1, the reference light irradiating unit 6 is arranged within an angular range over which an irradiation direction of the main lobe of the light beam can be controlled by the OPA 3 and outside the FOV. Specifically, in the housing 10, the reference light irradiating unit 6 is set on an inner wall surface of the front wall on which the opening portion 11 is formed or the like. For example, as the reference light irradiating unit 6, a laser diode that generates laser light of the same wavelength band as the light source 2 may be used.

The signal processing unit 7 includes a microcomputer that has a central processing unit (CPU) 71 and a semiconductor memory (hereafter, memory) 72 such as a read-only memory (ROM) or a random access memory (RAM). The signal processing unit 7 performs at least an ordinary process and a correction process. In addition to a program for performing the ordinary process and the correction process, the memory 72 stores therein at least a look-up table (hereafter, LUT) that is used in the correction process.

[1-2. Beam Profile]

Here, effects distortion of the PIC substrate on which the OPA 3 is mounted has on the beam profile will be described.

The beam profile is information that indicates characteristics of the light beam that is formed by the OPA 3. The beam profile may include at least one of a divergence angle of the beam and a beam irradiation direction. In the beam profile, shifting occurs in relation to an original design value as a result of the PIC substrate on which the OPA 3 is mounted becoming distorted due to heat and the like.

Figure 4:
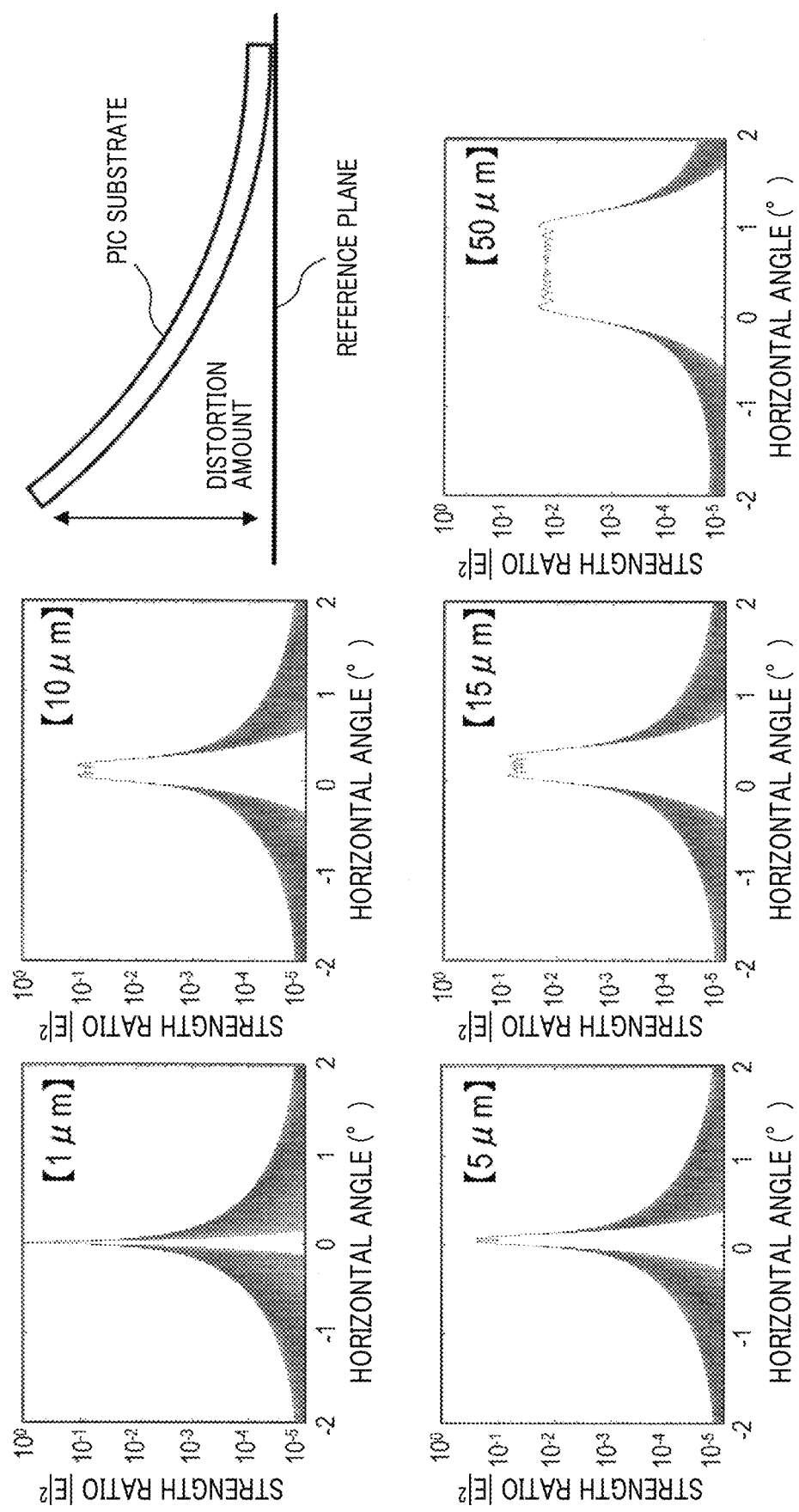
FIG. 4 is an explanatory diagram of effects on a beam profile due to distortion of a substrate.

Specifically, as shown in FIG. 4, with a substrate surface when distortion is not present in the PIC substrate as a reference plane, a distance from the reference plane when the PIC substrate is deformed such that one end of the PIC substrate moves away from the reference plane is a distortion amount. As the distortion amount increases, the divergence angle of the beam tends to increase. In addition, a deviation amount of the beam irradiation direction (that is, a center direction of the main lobe) also tends to increase.

Figure 5:
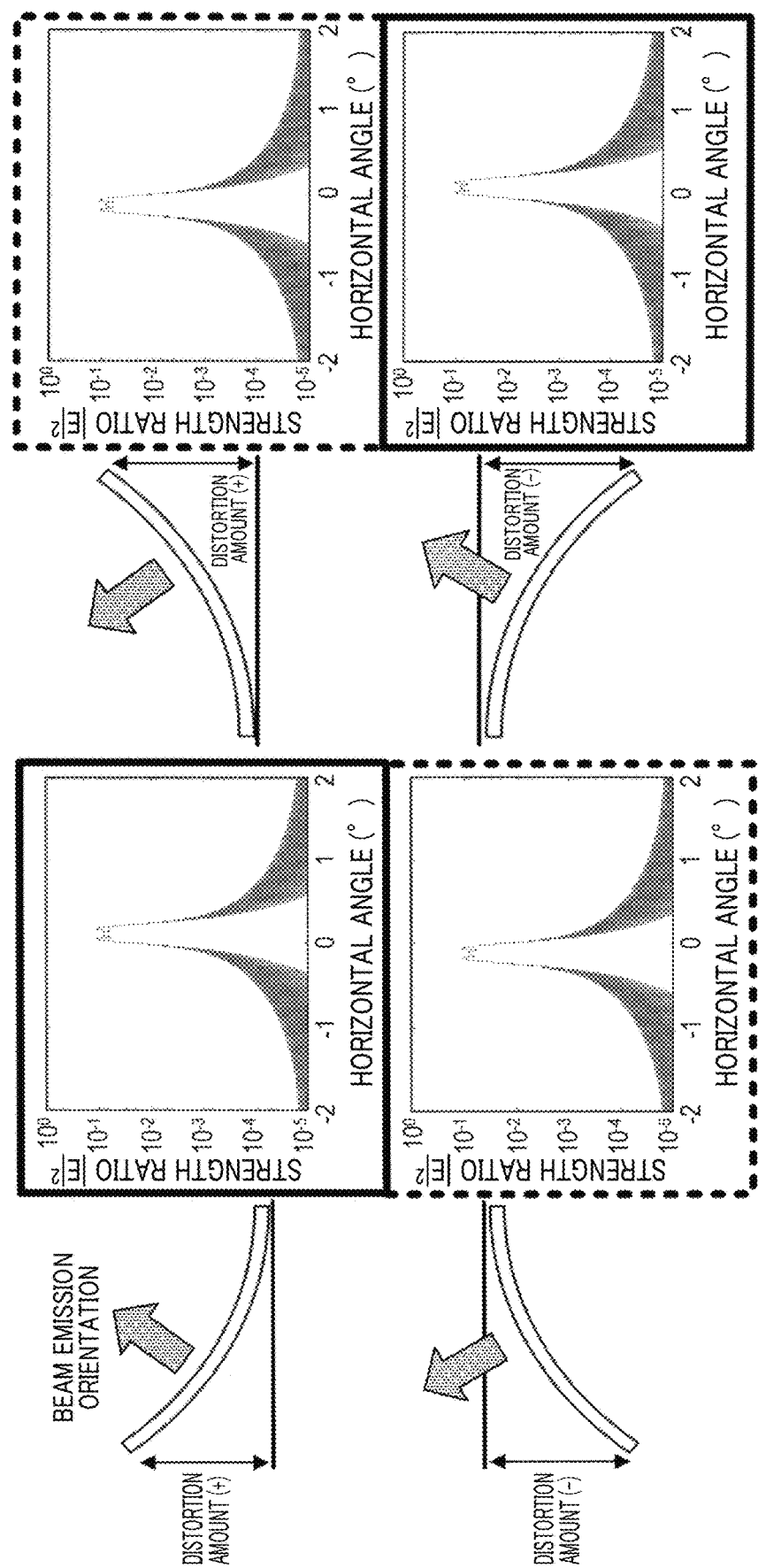
FIG. 5 is an explanatory diagram of a relationship between a manner of distortion of the substrate and the beam profile.

Furthermore, as shown in FIG. 5, in a case in which a left end of the PIC substrate is distorted in a positive direction from the reference plane that corresponds to the design value and a case in which a right end of the PIC substrate is distorted in a negative direction from the reference plane, the irradiation direction shifts in a rightward direction in both cases. In a case in which the right end of the PIC substrate is distorted in the positive direction from the reference plane and a case in which the left end of the PIC substrate is distorted in the negative direction from the reference plane, the irradiation direction shifts in a leftward direction in both cases.

The LUT is generated using correction light reception information that is obtained from the light reception signal detected by the detector 4 changing when the beam profile changes from the design value in correspondence to the distortion of the PIC substrate. For example, as the correction light reception information, strength of a beam signal or spread of a signal on a frequency axis (such as a halfwidth) may be used.

Specifically, an estimation LUT that is used for estimation of a phase shift amount and an update LUT that is used for update of the phase adjustment amount ψ are prepared. The phase shift amount is a vector value that indicates a phase of light detected in each element in a state in which distortion is present in the PIC substrate with reference to a phase of light detected in each element when distortion is not present in the PIC substrate.

The estimation LUT is generated using a result obtained by a relationship between a manner of distortion of the PIC substrate and the correction light reception information being measured in advance and a result obtained by the phase shift amount that occurs between elements as a result of distortion of the PIC substrate being logically calculated. The estimation LUT is an LUT that indicates correspondence between the light reception information and the phase shift amount.

The update LUT is an LUT that indicates correspondence between the phase shift amount and a correction amount Δψ that is used for update of the phase adjustment amount ψ. The correction amount Δψ is a correction amount to be added to a current value of the phase adjustment amount ψ to bring the phase shift amount closer to zero.

[1-3. Processes]

Figure 6:
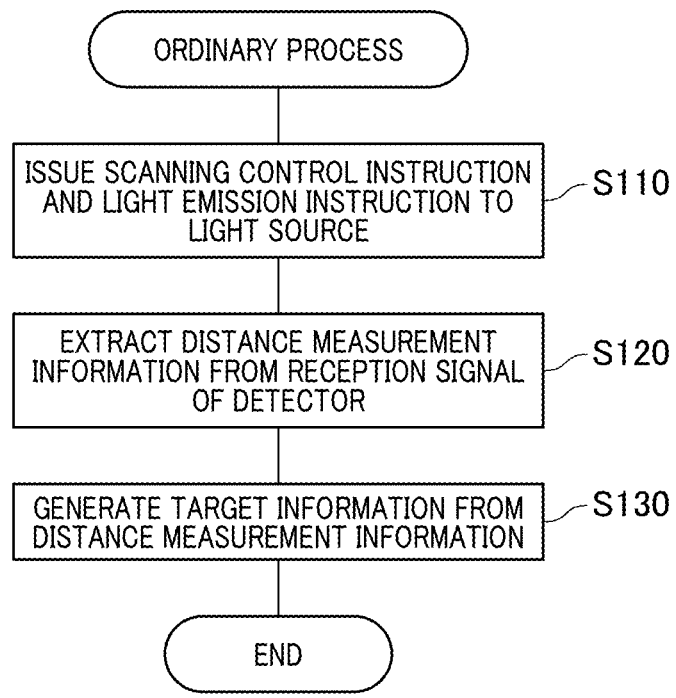
FIG. 6 is a flowchart of an ordinary process according to the first embodiment.

The ordinary process performed by the signal processing unit 7 will be described with reference to a flowchart in FIG. 6.

The ordinary process is repeatedly performed at an ordinary process cycle that is set in advance.

At S110, the signal processing unit 7 outputs an instruction to the phase controller 5 to perform scanning control and outputs an instruction for the light source 2 to emit light during an amount of time required for scanning of the FOV.

The phase controller 5 that receives the instruction for scanning control supplies the phase shifter 32 with a phase shift amount $\varphi(\theta)+\psi$ in which the phase adjustment amount $\psi$ set in the correction process is added to the scanning phase amount $\varphi(\theta)$, while successively changing the scanning phase amount $\varphi(\theta)$. As a result, the light beam that scans the FOV is irradiated from the OPA 3.

At subsequent S120, the signal processing unit 7 acquires the light reception signal from the detector 4 and acquires distance measurement information from the light reception signal. For example, the distance measurement information may include a frequency of a beat signal detected at each of upward modulation and downward modulation, used in an FMCW radar.

At subsequent S130, the signal processing unit 7 generates target information that includes a distance to an object that reflects light, a relative speed, an orientation at which the object is present, and the like using a known means of the FMCW radar based on the distance measurement information. The signal processing unit 7 then ends the process.

Figure 7:
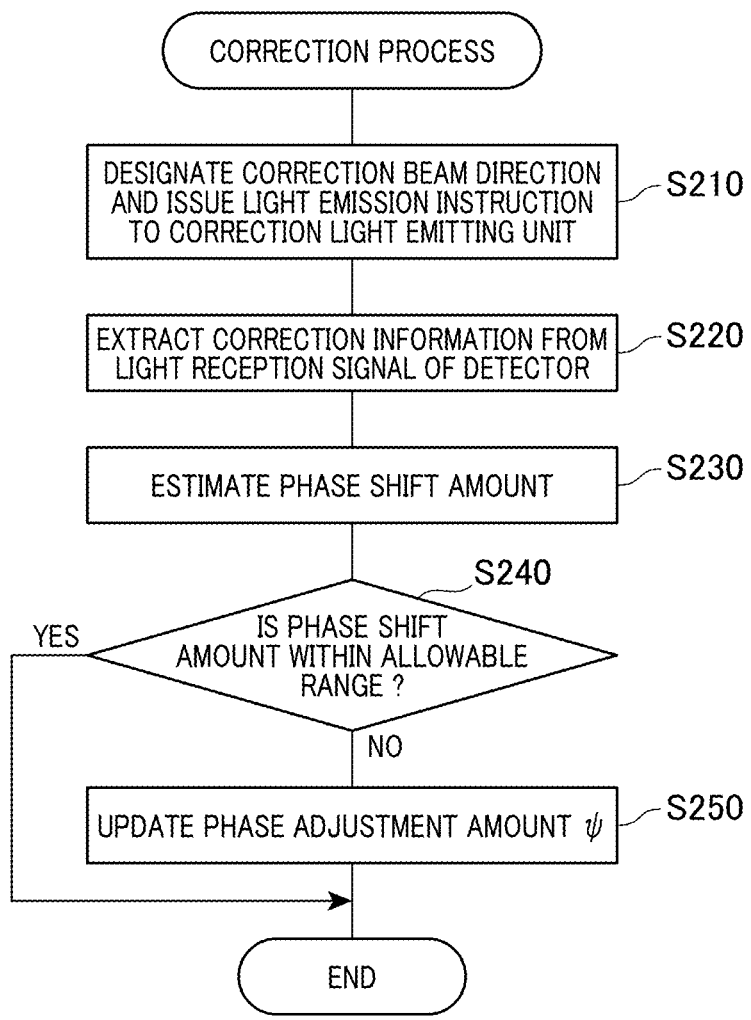
FIG. 7 is a flowchart of a correction process according to the first embodiment.

Next, the correction process performed by the signal processing unit 7 will be described with reference to a flowchart in FIG. 7.

The correction process is performed before or after the ordinary process every time the ordinary process is performed. The correction process may be performed at every correction process cycle that is set to be longer than the ordinary process cycle, or every time the optical scanner 1 is started. Here, the signal processing unit 7 that performs the correction process corresponds to a light-receiving-side correcting unit.

At S210, the signal processing unit 7 outputs an instruction to the phase controller 5 to perform correction control and outputs an instruction to the reference light irradiating unit 6 to emit light only during a period required for correction control.

The reference light irradiating unit 6 that receives the instruction to emit light irradiates a light beam towards the antenna array 33 of the OPA 3. The phase controller 5 that receives the instruction for correction control supplies the phase shifter 32 with a phase shift amount $\varphi(\theta L)+\psi$ in which the phase adjustment amount $\psi$ is added to a correction phase amount $\varphi(\theta L)$, with a direction in which the reference light irradiating unit 6 is positioned when viewed from the OPA 3 as $\theta L$. As a result, the OPA 3 receives the reference light that is irradiated from the reference light irradiating unit 6 in the state in which the beam of the antenna array 33 is directed towards the reference light irradiating unit 6.

At subsequent S220, the signal processing unit 7 acquires the light reception signal from the detector 4 and extracts correction information from the acquired light reception signal.

At subsequent S230, the signal processing unit 7 estimates the phase shift amount that occurs as a result of distortion of the PIC substrate on which the OPA 3 is mounted using the correction information extracted at S220 and the estimation LUT.

At subsequent S240, the signal processing unit 7 determines whether the phase shift amount estimated at S230 is of a magnitude within an allowable range that is set in advance. When the phase shift amount is within the allowable range, the signal processing unit 7 ends the process. When the phase shift amount exceeds the allowable range, the signal processing unit 7 advances the process to S250.

At S250, the signal processing unit 7 calculates the correction amount $\Delta\psi$ used for update of the phase adjustment amount $\psi$ using the phase shift amount estimated at S230 and the correction LUT. The signal processing unit 7 adds the calculated correction amount $\Delta\psi$ to the current value of the phase adjustment amount $\psi$ and updates the phase adjustment amount $\psi$. The signal processing unit 7 then ends the process.

[1-3. Effects]

According to the first embodiment described in detail above, following effects are achieved.

(1*a*) In the optical scanner 1, the reference light from the reference light irradiating unit 6 that is provided outside the OPA 3 is used for calculation of the phase adjustment amount $\psi$ that is used for correction of the beam profile and the beam irradiation direction $\theta$ of the OPA 3. Therefore, in addition to the phase shift amount that is attributed to internal factors such as characteristics between waveguides that are connected to the elements differing, the phase shift amount that is attributed to external factors such as distortion of the PIC substrate on which the OPA 3 is mounted can be detected. Consequently, effects of both internal factors and external factors can be eliminated.

In addition, as a result of the optical scanner 1, the effects distortion of the PIC substrate accompanying temperature environment changes has on the beam profile and the beam irradiation direction can be suppressed. Consequently, the optical scanner 1 can be applied to an onboard LiDAR or the like that is required to operate in harsh temperature environments.

(1*b*) In the optical scanner 1, the LUT is used for both the estimation of the phase shift amount from the correction light reception information and the calculation of the correction amount $\Delta\psi$ from the phase shift amount. Therefore, processing load on the signal processing unit 7 can be reduced.

[1-4. Modifications]

Figure 8:
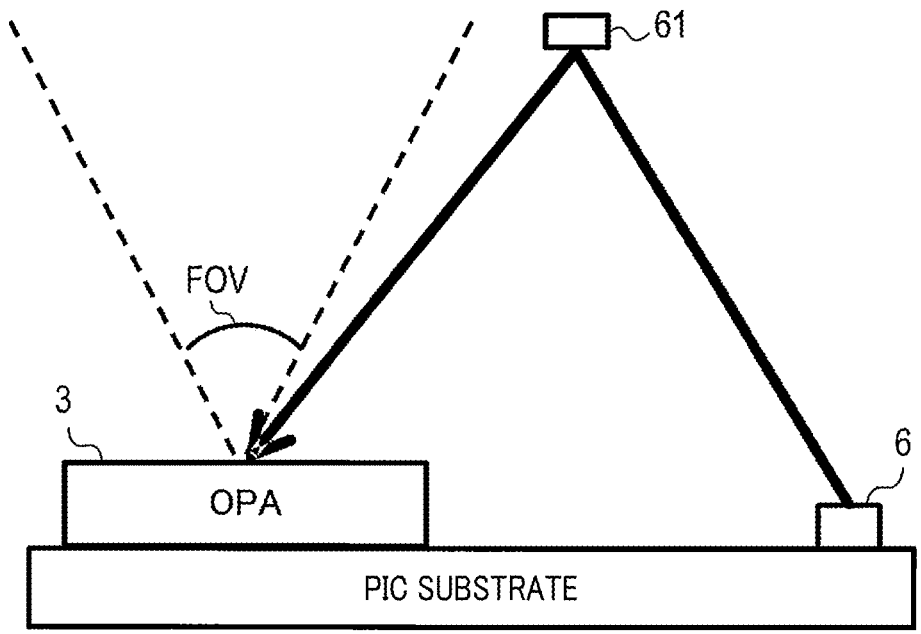
FIG. 8 is an explanatory diagram of an example in which a mirror is provided on a light path from a reference light irradiating unit to an optical phased array.

According to the above-described embodiment, the reference light from the reference light irradiating unit 6 is directly incident on the OPA 3. Instead of this configuration in which the reference light from the reference light irradiating unit 6 is directly incident on the OPA 3, for example, as shown in FIG. 8, a mirror 61 that reflects the reference light may be used. The mirror 61 and the reference light irradiating unit 6 may be arranged such that reflected light that is reflected by the mirror 61 is incident on the OPA 3.

Figure 9:
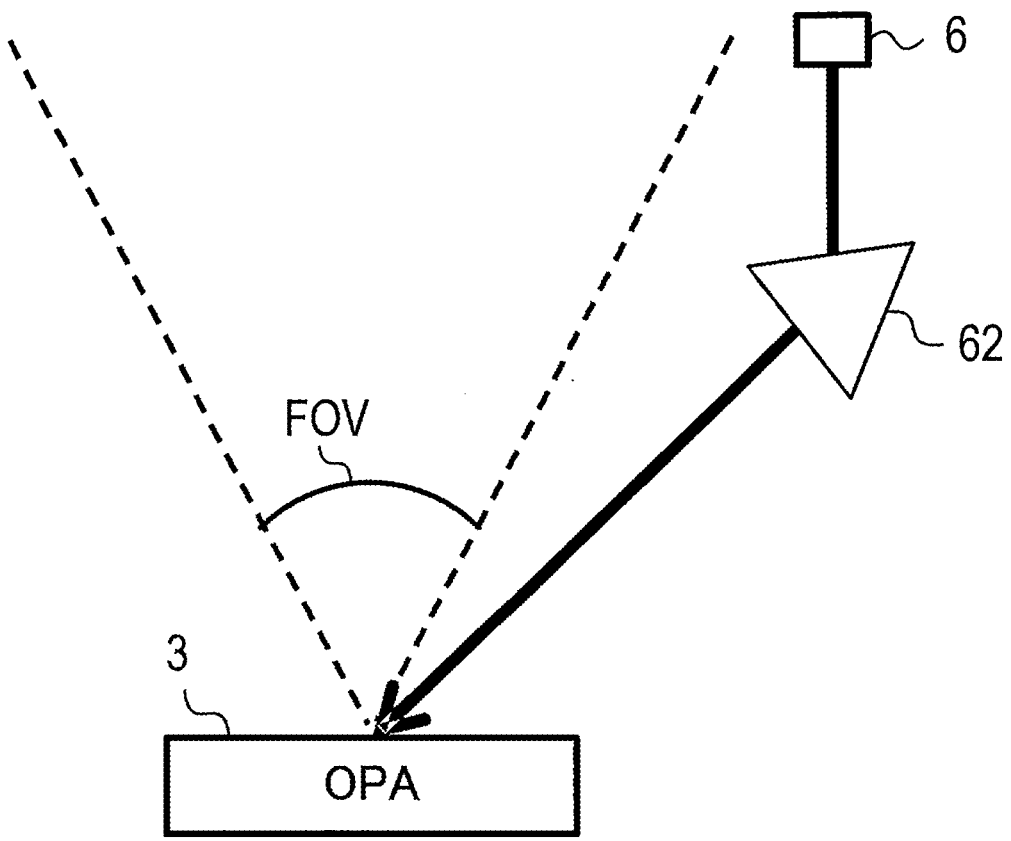
FIG. 9 is an explanatory diagram of an example in which a prism is provided on the light path from the reference light irradiating unit to the optical phased array.

In addition, for example, as shown in FIG. 9, a prism 62 that bends a light path by transmitting the reference light may be used. The prism 62 and the reference light irradiating unit 6 may be arranged such that the reference light that passes through the prism 62 is incident on the OPA 3.

Figure 10:
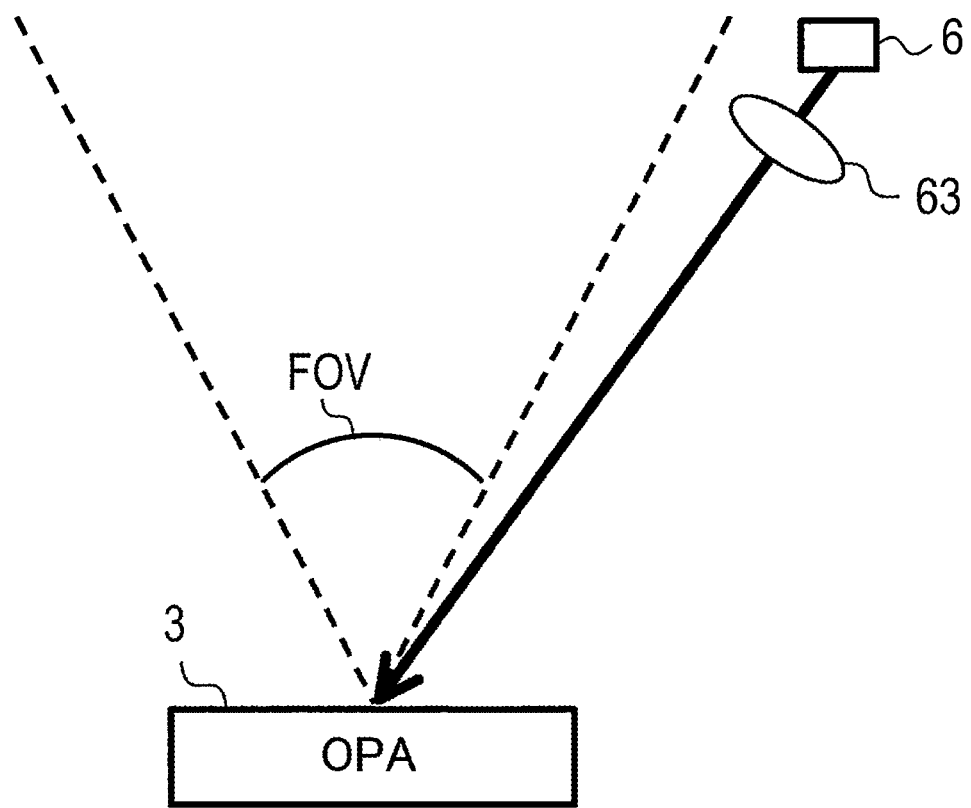
FIG. 10 is an explanatory diagram of an example in which a lens is provided on the light path from the reference light irradiating unit to the optical phased array.

Furthermore, for example, as shown in FIG. 10, a lens 63 that narrows a beam by transmitting the reference light may be used. The lens 63 and the reference light irradiating unit 6 may be arranged such that the reference light that passes through the lens 63 is incident on the OPA 3.

Here, in FIG. 8 to FIG. 10, the mirror 61, the prism 62, the lens 63, and the reference light irradiating unit 6 are all arranged outside the FOV. Any two or all three of the mirror 61, the prism 62 and the lens 63 may be used in combination.

When the light path is bent using at least one of the mirror 61 and the prism 62, a degree of freedom in the arrangement of the reference light irradiating unit 6 can be improved.

Figure 11:
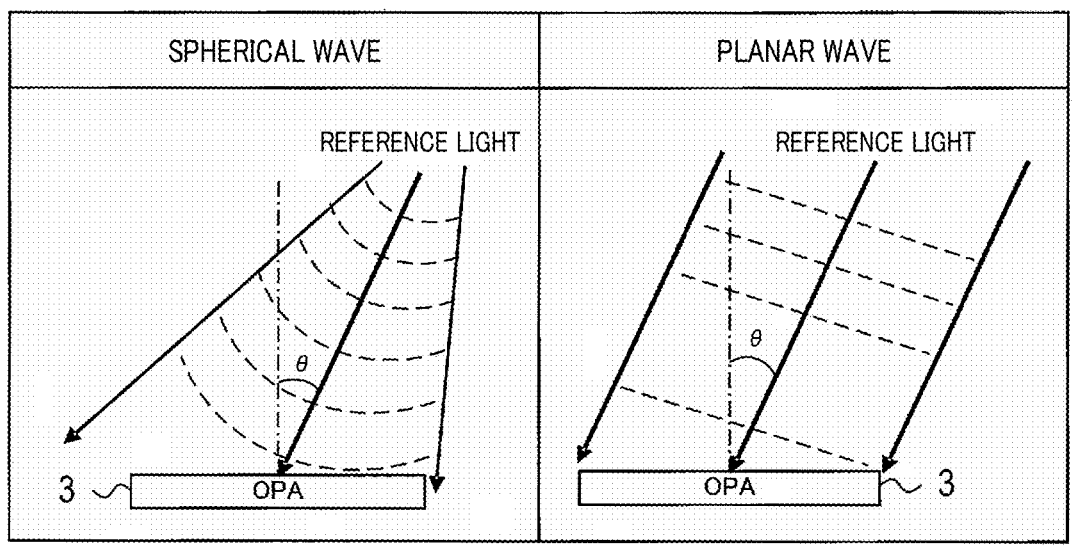
FIG. 11 is an explanatory diagram of variations in a wavefront of reference light.

When the lens 63 is used, a wavefront of the reference light can be adjusted. That is, as shown in FIG. 11, when the lens 63 is not used, the reference light that is incident on the OPA 3 is a spherical wave. However, as a result of the lens being used, the spherical wave can be converted to a planar wave. The wavefront of the reference light may be set such that the light reception information that is required for estimation of the phase shift amount can be more easily acquired.

2. Second Embodiment

[2-1. Differences from the First Embodiment]

A basic configuration according to a second embodiment is similar to that according to the first embodiment. Therefore, differences will be described below. Here, reference numbers that are same to those according to the first embodiment indicate identical configurations. Therefore, the foregoing descriptions are referenced.

According to the above-described first embodiment, in the correction process, the phase adjustment amount $\psi$ is calculated only once. The second embodiment differs from the first embodiment in that the phase adjustment amount $\psi$ is repeatedly calculated a plurality of times.

[2-2. Processes]

A correction process performed by the signal processing unit 7 instead of the correction process described with reference to FIG. 7 will be described with reference to a flowchart in FIG. 12.

In the correction process according to the present embodiment, S250 is added after S240.

That is, at S250 following S240, the signal processing unit 7 determines whether an end condition is met. The end condition is a step for preventing the correction process from being unable to be ended as a result of the phase shift amount not becoming a value within an allowable range even when update of the phase adjustment amount $\psi$ is repeated. For example, as the end condition, a repetition count of the processes from S210 to S240 reaching an upper limit count may be used.

When determined that the end condition is met, the signal processing unit 7 ends the process. When determined that the end condition is not met, the signal processing unit 7 returns the process to S210.

That is, according to the second embodiment, the update of the phase adjustment amount $\psi$ is repeated until the phase shift amount is a value within the allowable range or the end condition is met.

[2-3. Effects]

According to the second embodiment described in detail above, the effects (1a) and (1b) according to the first embodiment described above are achieved. In addition, following effects are achieved.

(2a) According to the second embodiment, the update of the phase adjustment amount $\psi$ is repeated until the phase shift amount becomes a value within the allowable range. Therefore, quality of the beam profile and accuracy of irradiation orientation of the light beam used for scanning can be maintained at a certain level or higher.

[2-4. Modifications]

According to the second embodiment, the update of the phase adjustment amount $\psi$ is simply repeated. However, the manner of distortion of the PIC substrate may be estimated from a manner of change in the phase shift amount that is obtained by the update being repeated, and the manner of distortion may be reflected in the update.

As shown in FIG. 5, even when shifting of the irradiation direction of the light beam is the same, the manner of distortion (that is, whether a formation surface of the antenna array 33 is concave or convex) of the PIC substrate differs. In addition, when a trend in the deviation amount of the phase significantly differs depending on the difference in the manner of distortion of the PIC substrate, correction LUTs that differs depending on the manner of distortion are required to be prepared. Hereafter, two correction LUTs that are prepared depending on the differences in the manner of distortion are a convex correction LUT and a concave correction LUT.

A correction process performed by the signal processing unit 7 in this case instead of the correction process described with reference to the flowchart in FIG. 7 will be described with reference to a flowchart in FIG. 13.

Figure 12:
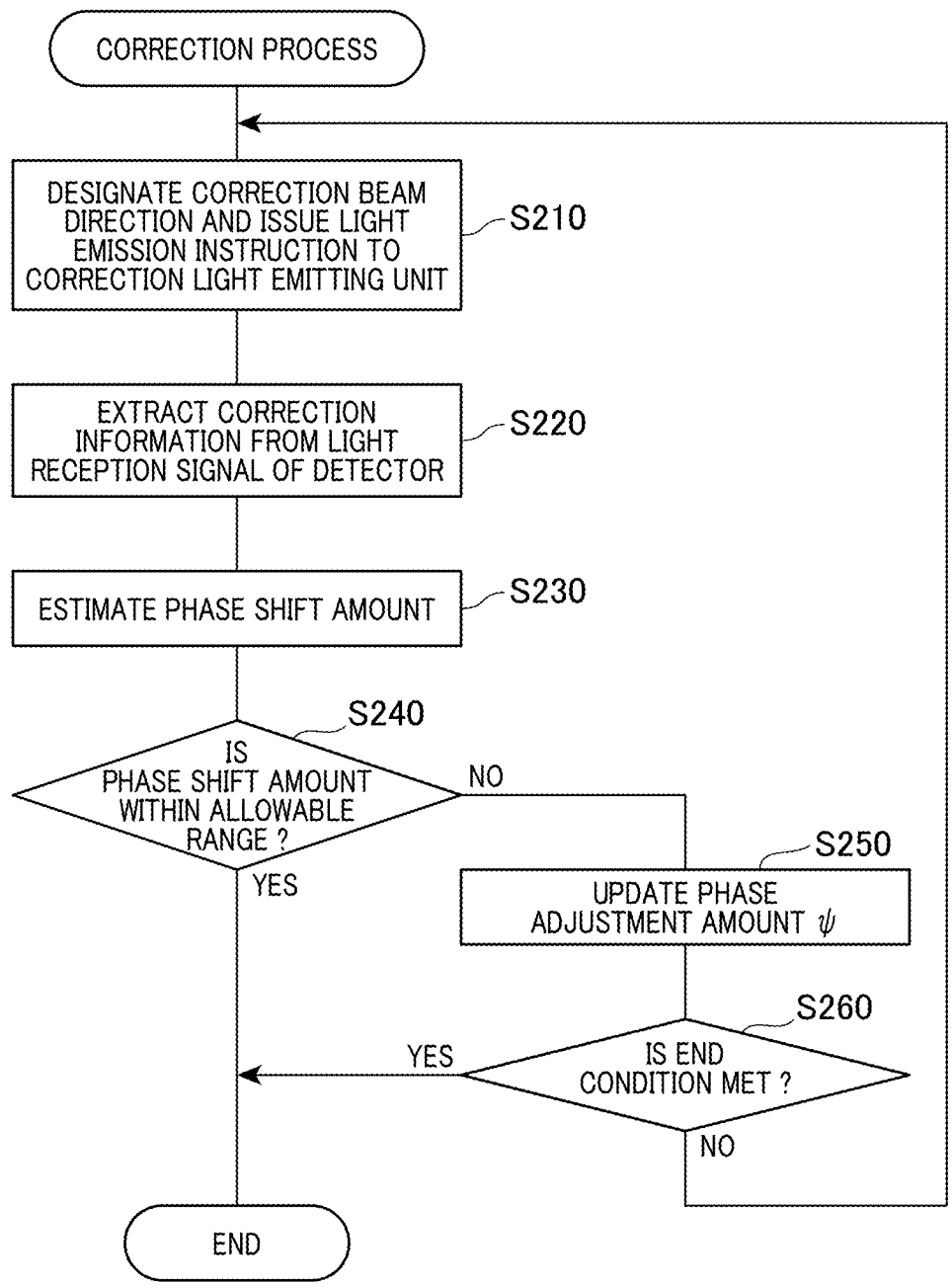
FIG. 12 is a flowchart of a correction process according to a second embodiment.
Figure 13:
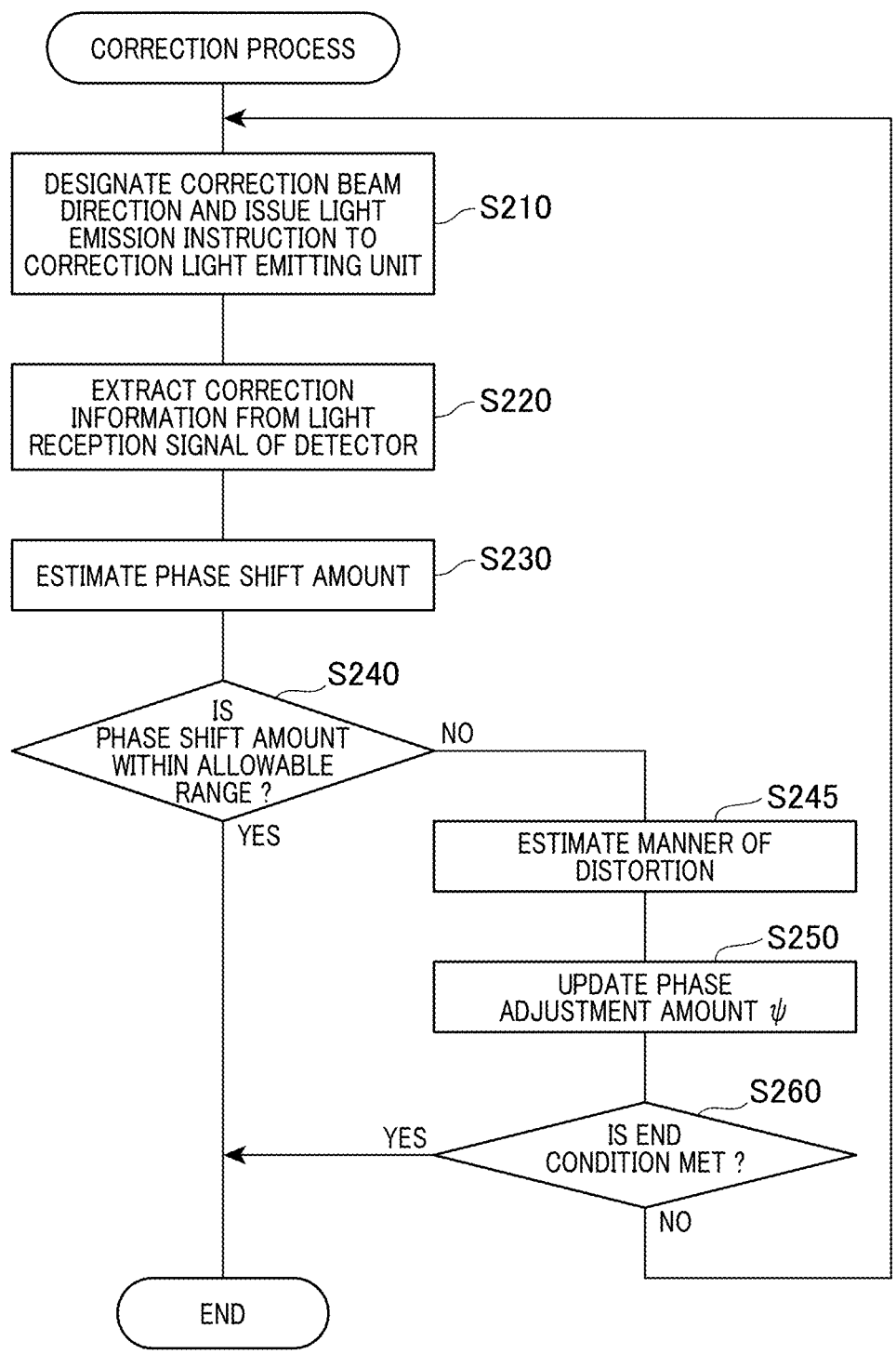
FIG. 13 is a flowchart of the correction process in a modification according to the second embodiment.

In the flowchart in FIG. 13, compared to the flowchart in FIG. 12, S245 is added between S240 and S250.

That is, at S240, when determined that the phase shift amount is outside the allowable range, the signal processing unit 7 advances the process to S245.

At S245, when the repetition count of the processes at S210 to S240 is the first time in a current correction process, the signal processing unit 7 arbitrarily selects either of the concave correction LUT and the convex correction LUT. The correction LUT that has been last used in a previous correction process may be selected. When the repetition count is the second time or subsequent thereto, if a magnitude of the phase shift amount is greater that a previous magnitude, the selection of the correction LUT is considered erroneous and the selection of the correction LUT is switched. If the magnitude is equal to or less than the previous magnitude, the selection of the correction LUT is considered correct and the current selection is continued.

As a result of a step for assuming the manner of distortion of the PIC substrate being added in this manner, update accuracy regarding the phase adjustment amount $\psi$ can be improved.

3. Third Embodiment

[3-1. Differences from the First Embodiment]

A basic configuration according to a third embodiment is similar to that according to the first embodiment. Therefore, differences will be described below. Here, reference numbers that are same to those according to the first embodiment indicate identical configurations. Therefore, the foregoing descriptions are referenced.

According to the first embodiment described above, the reference light irradiating unit 6 has a single reference light source. The third embodiment differs from the first embodiment in that the reference light irradiating unit 6 has a plurality of reference light sources.

The light sources belonging to the reference light irradiating unit 6 are set such that at least either of an incident angle of the reference light onto the OPA 3 and the wavefront of the reference light differs. The incident angle of the reference light may be changed based on arrangement of the reference light sources. Alternatively, as shown in FIG. 8 and FIG. 9, the incidence angle may be changed through use of the mirror 61 or the prism 62. For example, as shown in FIG. 10, the wavefront of the reference light may be changed by the presence/absence of the lens 63.

[3-2. Processes]

Figure 14:
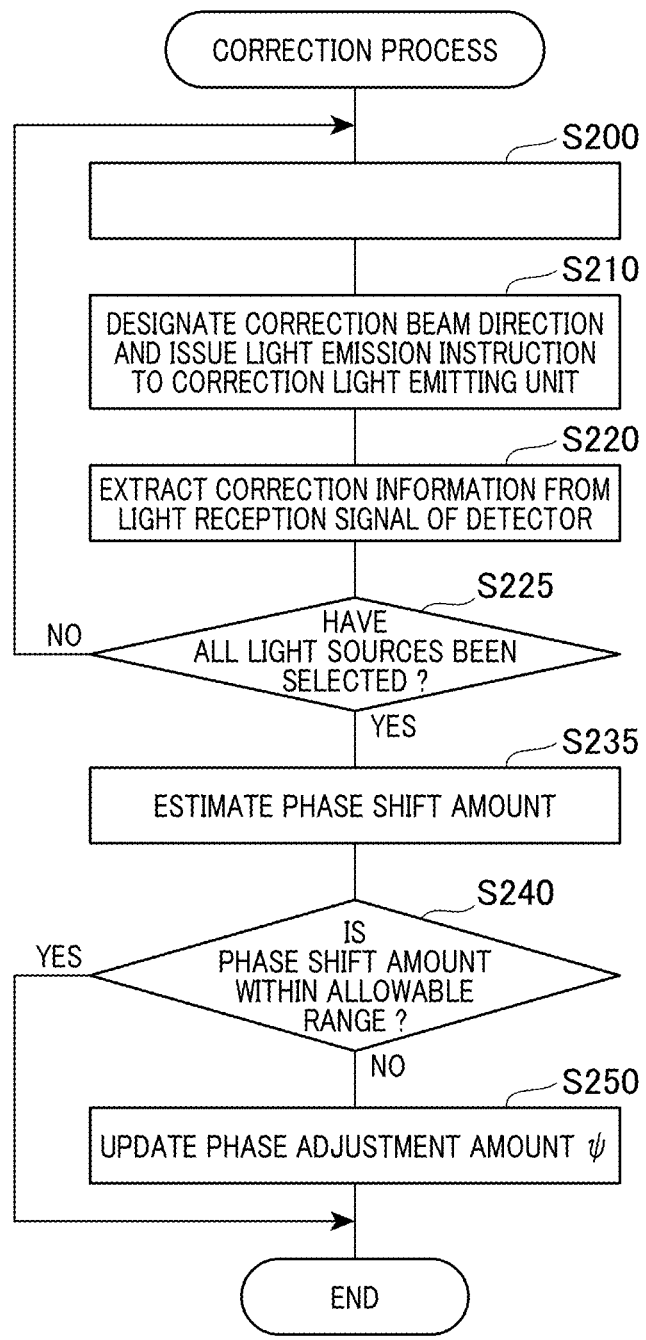
FIG. 14 is a flowchart of a correction process according to a third embodiment.

A correction process performed by the signal processing unit 7 instead of the correction process described with reference to FIG. 7 will be described with reference to a flowchart in FIG. 14.

In the correction process according to the present embodiment, S200 and S225 are added, and S235 is performed instead of S230.

At S200, the signal processing unit 7 selects any one of the plurality of light sources belonging to the reference light irradiating unit 6.

Subsequent S210 to S220 are similar to that described above. However, at S210, the light source selected at S200 emits light.

At subsequent S225, the signal processing unit 7 determines whether all light sources belonging to the reference light irradiating unit 6 have been selected at S200. When all reference light sources have been selected, the signal processing unit 7 advances the process to S230. When an unselected reference light source is present, the signal processing unit 7 returns the process to S200.

At S235, the signal processing unit estimates 7 the phase shift amount using a plurality of pieces of correction light reception information that are extracted using the plurality of light sources. In the estimation, the phase shift amount may be estimated from the correction light reception information that is integrated by a method of some kind. Alternatively, a single phase shift amount may be calculated by estimation results of a plurality of phase shift amounts calculated using individual LUTs for each of the plurality of pieces of light reception information being integrated.

Subsequent S240 and S250 are similar to that described above.

Here, the processes at S240 and subsequent may be configured such that the update of the phase adjustment amount ψ is repeated in a manner similar to the processes at S240 and subsequent thereto shown in FIG. 12 or FIG. 13.

[3-3. Effects]

According to the third embodiment described in detail above, the effects (1a) and (1b) according to the first embodiment described above are achieved. In addition, following effects are achieved.

(3a) According to the third embodiment, the correction light reception information is extracted for each of the plurality of light sources of which the incident angle onto the OPA 3 or the wavefront differs. The phase shift amount is estimated using the extracted plurality of pieces of correction light reception information (that is, information respectively measured in differing states). That is, because more pieces of correction light reception information can be used for estimation of the phase shift amount, estimation accuracy can be improved.

4. Fourth Embodiment

[4-1. Differences from the First Embodiment]

A basic configuration according to a fourth embodiment is similar to that according to the first embodiment. Therefore, differences will be described below. Here, reference numbers that are same to those according to the first embodiment indicate identical configurations. Therefore, the foregoing descriptions are referenced.

According to the first embodiment, the signal processing unit 7 uses the reception signal from the detector 4 for the correction process. The fourth embodiment differs from the first embodiment in that phase-adjusted branched light that is inputted from the phase shifter 32 to the splitter 31 is used.

Figure 15:
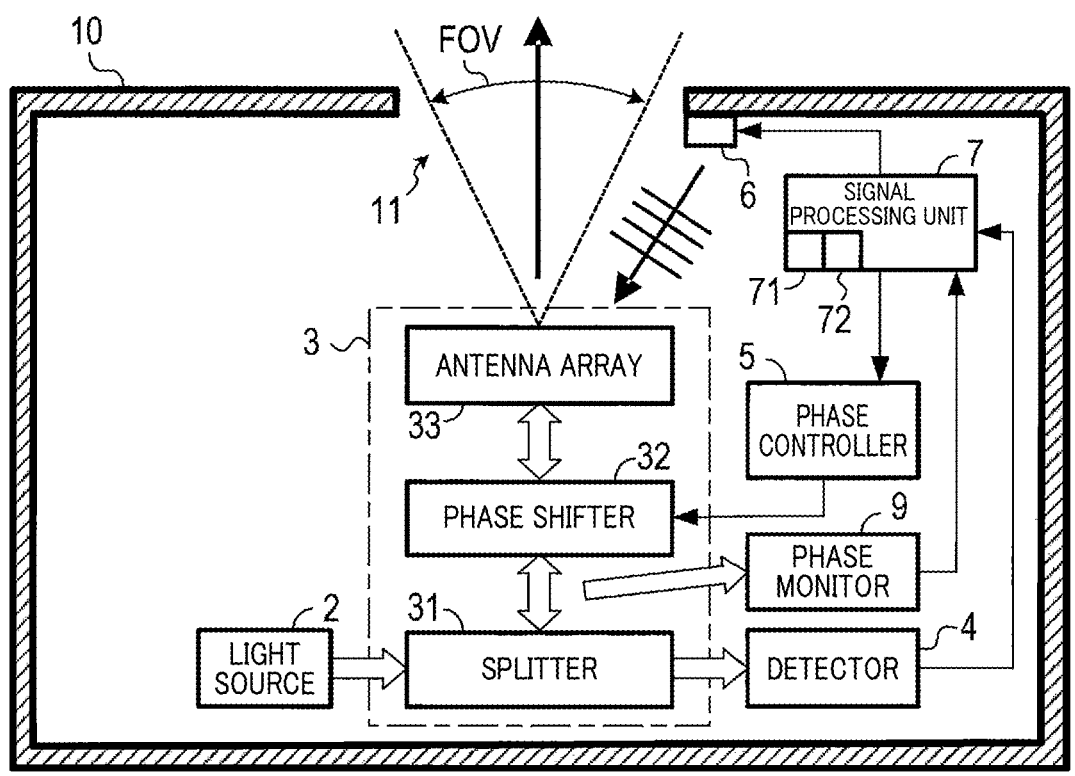
FIG. 15 is a block diagram of a configuration of an optical scanner according to a fourth embodiment.

As shown in FIG. 15, an optical scanner 1a according to the fourth embodiment includes a phase monitor 9 in addition to the configuration of the optical scanner 1 according to the first embodiment.

The phase monitor 9 detects a phase of branched light for each of a plurality of branched lights that are received by the antenna array 33 and phase-adjusted in the phase shifter 32, and supplies the detected phase to the signal processing unit 7.

Here, the phase monitor 9 may monitor the phases of all branched lights corresponding to the number of elements. Alternatively, the phase monitor 9 may monitor the phases of the branched lights corresponding to a portion of elements that are selected at regular intervals along the array. That is, a state of substrate distortion has a low likelihood of causing sudden changes between adjacent elements. Therefore, the phases of the branched lights are not required to be monitored for all elements.

[4-3.] Effects

According to the fourth embodiment described in detail above, the effects (1a) and (1b) according to the first embodiment described above are achieved. In addition, following effects are achieved.

(4a) In the optical scanner 1a, the phase shift amount is directly detected from the phases of the branched lights before being combined. Therefore, a highly accurate phase shift amount can be acquired. Consequently, the phase adjustment amount ψ can be accurately updated.

5. Fifth Embodiment

[5-1. Differences from the First Embodiment]

A basic configuration according to a fifth embodiment is similar to that according to the first embodiment. Therefore, differences will be described below. Here, reference numbers that are same to those according to the first embodiment indicate identical configurations. Therefore, the foregoing descriptions are referenced.

According to the first embodiment described above, light emission and light reception are performed using a single OPA 3. The fifth embodiment differs from the first embodiment in that an OPA 3A and an OPA 3B that differ regarding light emission and light reception are used.

Figure 16:
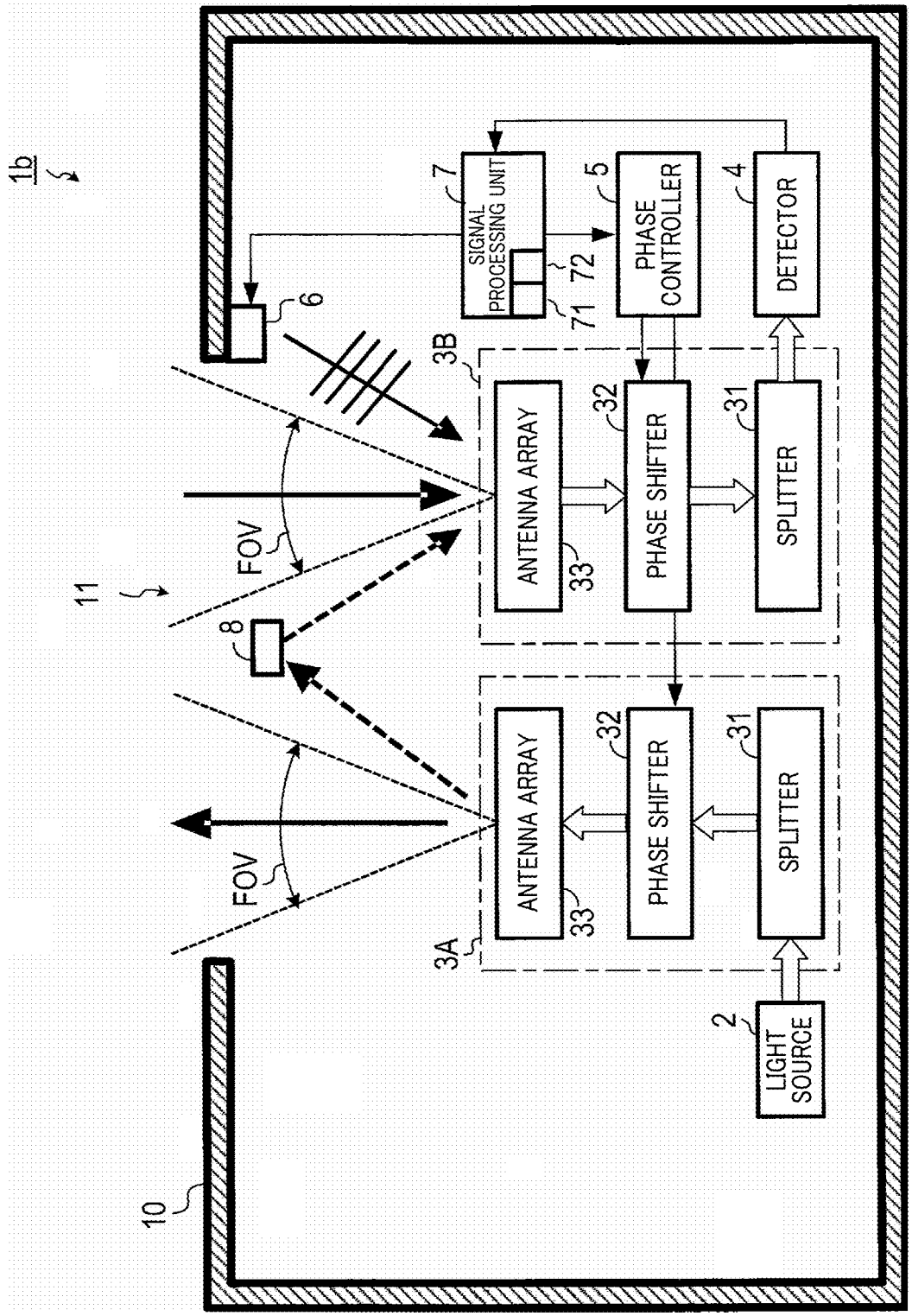
FIG. 16 is a block diagram of a configuration of an optical scanner according to a fifth embodiment.

As shown in FIG. 16, an optical scanner 1b according to the fifth embodiment includes a light-emitting-side OPA 3A and a light-receiving-side OPA 3B instead of the OPA 3. In addition, the optical scanner 1b further includes a light-guide unit 8.

The light-emitting-side OPA 3A and the light-receiving-side OPA 3B both have a configuration similar to that of the OPA 3. However, constituent elements of the light-emitting-side OPA 3A are denoted as a splitter 31A, a phase shifter 32A, and an antenna array 33A. Constituent elements of the light-receiving-side OPA 3B are denoted as a splitter 31B, a phase shifter 32B, and an antenna array 33B.

The light source injects light into the splitter 31A. The detector 4 is connected such that composite light is received from the splitter B.

The splitter 31A divides the incident light from the light source 2 into a plurality of lights. The phase shifter 32A individually adjusts the phases of the plurality of branched lights divided by the splitter 31A based on an instruction from the phase controller 5. The antenna array 33A irradiates the phase-adjusted light outside the housing 10 through the opening portion 11.

The antenna array 33B receives light that is incident inside the housing 10 through the opening portion 11. The phase shifter 32B individually adjusts the phase of light that is received by each element configuring the antenna array 33B based on an instruction from the phase controller 5. The splitter 31B combines the light that is phase-adjusted by the phase shifter 32B into a single signal and supplies the signal to the detector 4.

The phase controller 5 individually sets a phase adjustment amount ψA that is used in the phase shifter 32A and a phase adjustment amount ψB that is used in the phase shifter 32B. When an instruction for scanning control is inputted from the signal processing unit 7, the phase shifters 32A and 32B perform control using the phase shift amounts φ(θ)+ψA and φ(θ)+ψB in which the differing phase adjustment amounts ψA and ψB are added to a common scanning phase amount φ(θ).

The reference light irradiating unit 6 is set to irradiate the reference light towards the antenna array 33B.

For example, a mirror may be used as the light-guide unit 8. The light-guide unit 8 is arranged such that irradiated light from the antenna array is reflected and the reflected light enters the antenna array 33B.

The light-guide unit 8 is arranged within an angular range over which an irradiation direction of a main lobe of a light beam formed by the light-emitting-side OPA 3A can be controlled, an angular range over which an irradiation direction of a main lobe of a light beam formed by the light-receiving-side OPA 3B can be controlled, and outside the FOV. A direction in which the light-guide unit 8 is positioned when viewed from the light-emitting-side OPA 3A θA is. A direction in which the light-guide unit 8 is positioned when viewed from the light-receiving-side OPA 3B is θB.

[5-2. Processes]

An ordinary process by the optical scanner 1b is similar to the ordinary process described according to the first embodiment.

A correction process by the optical scanner 1b is performed so as to be separated into two stages. First, a light-receiving-side correction process for calculating the phase adjustment amount ψB of the light-receiving-side OPA 3B is performed. Subsequently, a light-emitting-side correction process for calculating the phase adjustment amount ψA of the light-emitting-side OPA 3A is performed. Here, the signal processing unit 7 that performs the light-receiving-side correction process corresponds to a light-receiving-side correcting unit. The signal processing unit 7 that performs the light-emitting-side correction process corresponds to a light-emitting-side correcting unit.

Here, the light-receiving-side correction process is similar to the correction process described according to the first embodiment. The light that is emitted from the reference light irradiating unit 6 is received by the antenna array 33B and calculation is performed by the light reception signal from the detector 4. Here, the light-receiving-side correction process is similar to the correction process described according to the first embodiment. Therefore, descriptions are omitted.

Figure 17:
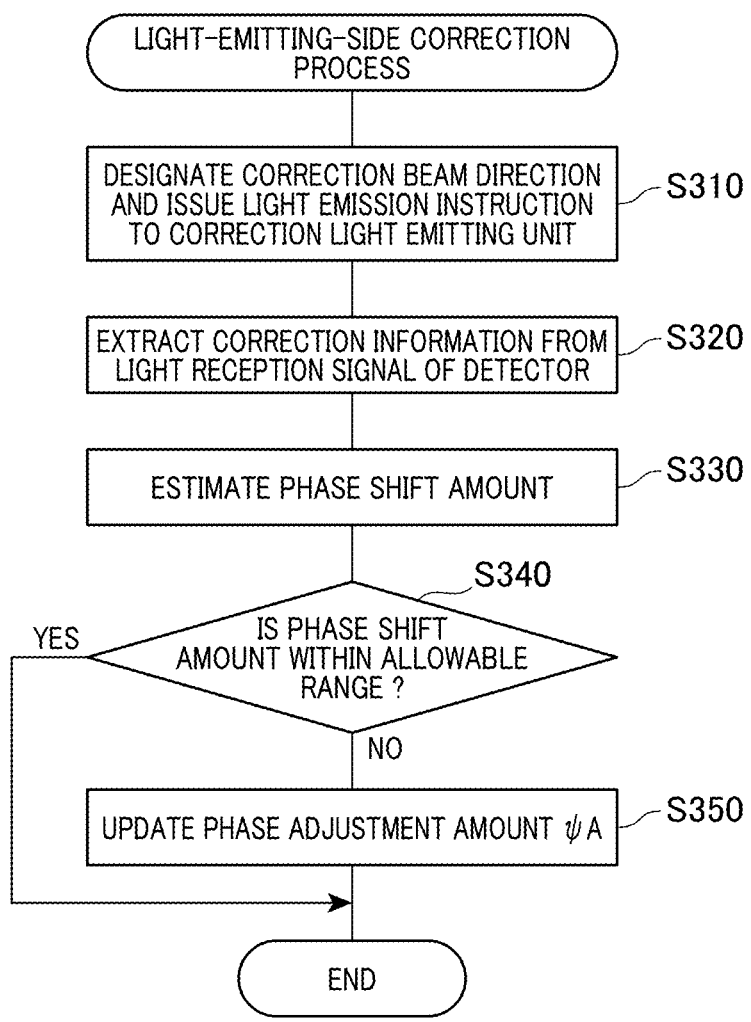
FIG. 17 is a flowchart of a light-emitting-side correction process according to the fifth embodiment.

The light-emitting-side correction process will be described with reference to a flowchart in FIG. 17. Here, the light-receiving-side correction process is performed before the light-emitting-side correction process is performed. Therefore, the phase adjustment amount ψB of the light-receiving-side OPA 3B is in a corrected state.

At S310, the signal processing unit 7 outputs an instruction to the phase controller 5 to perform correction control on the light-emitting-side and outputs an instruction to the light source 2 to emit light only during a period required for correction control.

A light beam is irradiated from the reference light irradiating unit 6 towards the antenna array 33 of the OPA 3. The phase controller 5 that receives the instruction for correction control supplies, to the phase shifter 32A, a phase shift amount φ(θA)+ψA in which the phase adjustment amount ψA is added to a correction phase amount φ(θA). Furthermore, the phase controller 5 supplies, to the phase shifter 32B, a phase shift amount φ(θB)+ψB in which the phase adjustment amount ψB is added to a correction phase amount φ(θB).

As a result, the reference light is irradiated from the OPA 3A to the light-guide unit 8. The reference light that is reflected by the light-guide unit 8 is received by the OPA 3B.

Processes at subsequent S320 to S350 are similar to the processes at S220 to S250 described according to the first embodiment. However, at S350, the phase adjustment amount ψA is updated.

[5-3. Effects]

According to the fifth embodiment described in detail above, the effects (1a) and (1b) according to the first embodiment described above are achieved. In addition, following effects are achieved.

(5a) The optical scanner 1b performs correction of the light-receiving-side OPA 3B using a result obtained by the reference light from the reference light irradiating unit 6 being received by the light-receiving-side OPA 3B. Subsequently, correction of the light-emitting-side OPA 3A is performed using a result obtained by irradiated light from the light-emitting-side OPA 3A being received by the light-receiving-side OPA 3B through the light-guide unit 8. Therefore, phase shifting that is attributed to the light-receiving-side OPA 3B and phase shifting that is attributed to the light-emitting-side OPA 3A can be separated and individually adjusted.

[5-4. Modifications]

Processes at S340 and subsequent thereto in the light-emitting-side correction process may be configured such that update of the phase adjustment amount ψ is repeated in a manner similar to the processes at S240 and subsequent thereto shown in FIG. 12 or FIG. 13.

When the light-receiving-side correction process is configured to estimate the manner of distortion of the PIC substrate, an assumption result may be used in the light-emitting-side correction process and the correction LUT may be selected. That is, the light-emitting-side OPA 3A and the light-receiving-side OPA 3B are arranged on the same PIC substrate. Due to this, the assumption result regarding the manner of distortion in the correction process of the light-emitting-side OPA 3A may be used in the correction process of the light-receiving-side OPA 3B. In addition, the assumption result regarding the manner of distortion in the correction process of the light-receiving-side OPA 3B may be used in the correction process of the light-emitting-side OPA 3A.

The light-guide unit 8 is configured to form a single light path. However, the light-guide unit 8 may be configured to form a plurality of light paths. In this case, adjusted light irradiated onto the light-receiving-side OPA 3B through each light path is set such that at least either of the incident angle of the adjusted light and the wavefront of the adjusted light differs. In a manner similar to that in the examples in FIG. 8 and FIG. 9, the incident angle of the adjusted light may be changed through use of the mirror 61 or the prism 62.

6. Sixth Embodiment

[6-1. Differences from the Fifth Embodiment]

A basic configuration according to a sixth embodiment is similar to that according to the fifth embodiment. Therefore, differences will be described below. Here, reference numbers that are same to those according to the fifth embodiment indicate identical configurations. Therefore, the foregoing descriptions are referenced.

According to the fifth embodiment described above, light is irradiated using the light-emitting-side OPA 3A. The sixth embodiment differs from the fifth embodiment in that light is irradiated without use of the light-emitting-side OPA 3A.

Figure 18:
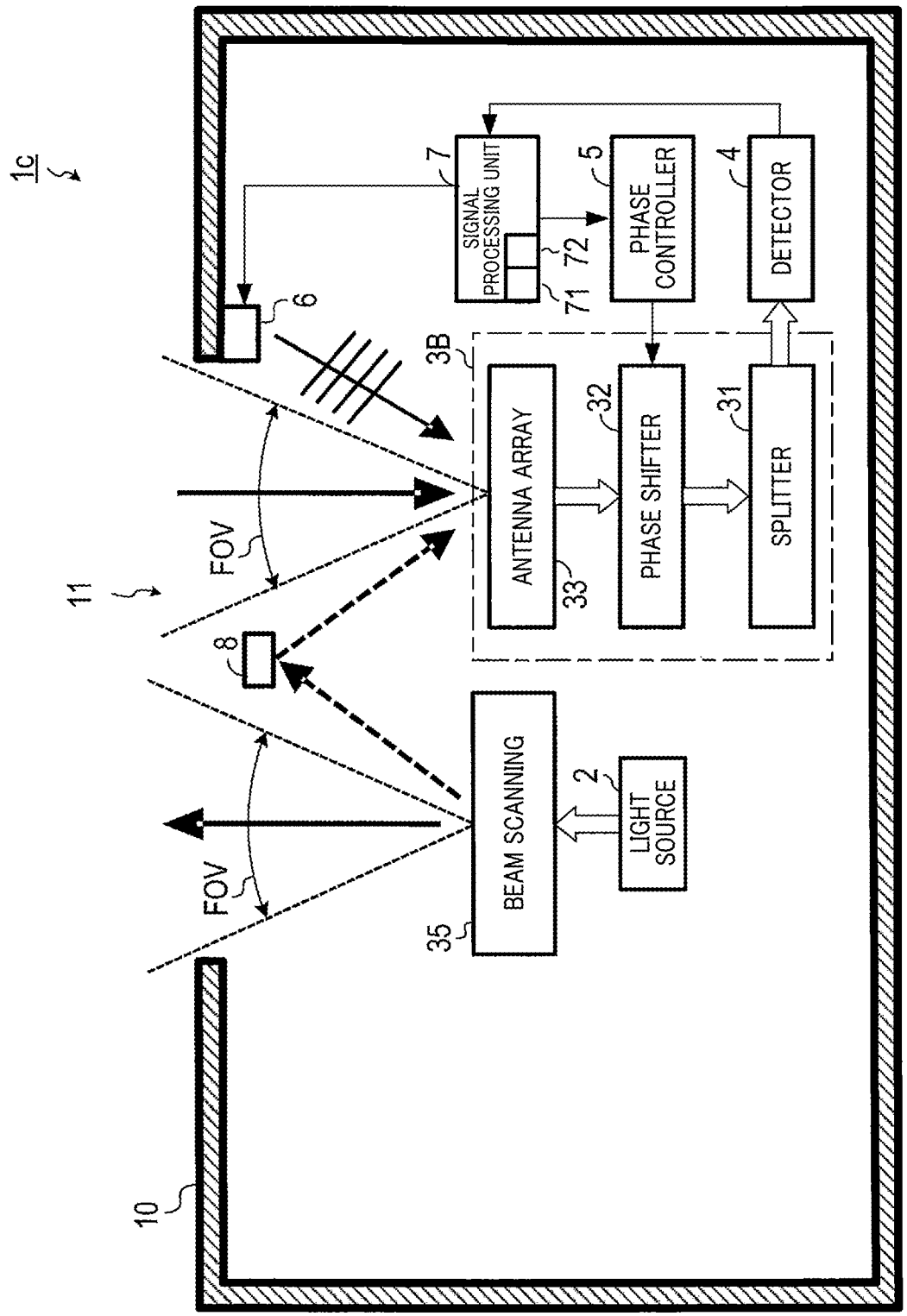
FIG. 18 is a block diagram of a configuration of an optical scanner according to a sixth embodiment.

As shown in FIG. 18, an optical scanner 1c according to the sixth embodiment includes a beam scanning unit 35 instead of the light-emitting-side OPA 3A.

The beam scanning unit 35 has a known mechanism for implementing beam scanning by a method other than the OPA. For example, the beam scanning unit 35 may include an optical system that narrows a light beam that is radiated from the light source 2 and a scanning mechanism that changes an irradiation direction of the beam that has been narrowed by the optical system using a rotating mirror or the like.

[6-2. Processes]

In the optical scanner 1c, the signal processing unit 7 performs the light-receiving-side correction process. The light-emitting-side correction process is omitted.

[6-3. Effects]

According to the sixth embodiment described in detail above, effects similar to those according to the fifth embodiment can be achieved, excluding effects related to the light-emitting-side.

7. Other Embodiments

The embodiments of the present disclosure are described above. However, the present disclosure is not limited to the above-described embodiments. Various modifications are possible.

(7a) According to the above-described embodiments, the reference light irradiating unit 6 and the light-guide unit 8 are arranged in positions to which the main lobes of the OPAs 3, 3A, and 3B can be directed. However, the arrangement of the reference light irradiating unit 6 and the light-guide unit 8 is not limited to the position to which the main lobe can be directed. For example, when the main lobe is in a predetermined direction (such as a front direction), the reference light irradiating unit 6 and the light-guide unit 8 may be arranged in positions in which the grating lobe is irradiated.

(7b) The signal processing unit 7 and a method thereof described in the present disclosure may be implemented by a dedicated computer that is provided so as to be configured by a processor and a memory, the processor being programmed to provide a single or a plurality of functions that are realized by a computer program. Alternatively, the signal processing unit 7 and a method thereof described in the present disclosure may be implemented by a dedicated computer that is provided by a processor being configured by a single or a plurality of dedicated hardware logic circuits. Alternatively, the signal processing unit 7 and a method thereof described in the present disclosure may be implemented by one or more dedicated computers that are configured by a combination of a processor that is programmed to provide a single or a plurality of functions, a memory, and a processor that is configured by one or more hardware logic circuits. In addition, the computer program may be stored in a non-transitory computer-readable (tangible) recording medium that can be read by a computer as instructions performed by the computer. A method for implementing functions of sections included in the signal processing unit 7 is not necessarily required to include software. All of the functions may be implemented through use of a single or a plurality of pieces of hardware.

(7c) A plurality of functions provided by a single constituent element according to the above-described embodiments may be implemented by a plurality of constituent elements. A single function provided by a single constituent element may be implemented by a plurality of constituent elements. In addition, a plurality of functions provided by a plurality of constituent elements may be implemented by a single constituent element. A single function provided by a plurality of constituent elements may be implemented by a single constituent element. Furthermore, a part of a configuration according to the above-described embodiment may be omitted. Moreover, at least a part of a configuration according to an above-described embodiment may be added to or replace a configuration according to another of the above-described embodiments.

(7d) The present disclosure can also be implemented by various modes in addition to the above-described optical scanner, such as a system in which the optical scanner is a constituent element, a program for enabling a computer to function as the optical scanner, a non-transitory computer-readable (tangible) recording medium such as a semiconductor memory that records the program therein, and a phase adjustment method for an OPA.

What is claimed is:

1. An optical scanner comprising:
    a light receiving unit that includes an optical phased array that is configured to implement scanning by a light beam by individually controlling phases of a plurality of branched lights using a scanning phase amount;
    a reference light irradiating unit that is configured to generate reference light and irradiate the reference light onto the light receiving unit; and
    a light-receiving-side correcting unit that is configured to estimate a phase shift amount that occurs in the plurality of branched lights as a result of distortion of a substrate on which the light receiving unit is mounted from a detection result of the light receiving unit onto which the reference light is incident, and set a phase adjustment amount to be applied to the plurality of branched lights such that the estimated phase shift amount decreases.

2. The optical scanner according to claim 1, wherein:
    the reference light irradiating unit includes a plurality of light sources; and
    the plurality of light sources are set such that at least either of an incident angle of the reference light onto the light receiving unit and a wavefront of the reference light differs.

3. The optical scanner according to claim 2, wherein:
    the reference light irradiating unit is arranged outside an angular range that is scanned by the light receiving unit.

4. The optical scanner according to claim 3, wherein:
    the light-receiving-side correcting unit is configured to repeatedly perform calculation of the phase adjustment amount until an estimated value of the phase shift amount becomes a value within an allowable range that is set in advance and estimate a manner of distortion of the substrate on which the light receiving unit is mounted based on changes in the estimated value of the phase shift amount.

5. The optical scanner according to claim 3, further comprising:
a light emitting unit that has the optical phased array that is separate from that of the light receiving unit;
a light-guide unit that is configured to guide light that is irradiated from the light emitting unit such that the light is incident on the light receiving unit; and
a light-emitting-side correcting unit that is configured to estimate the phase shift amount of the plurality of branched lights belonging to the light emitting unit that occurs as a result of distortion of the substrate on which the light emitting unit is mounted from the detection result of the light receiving unit onto which the light guided by the light-guide unit is incident, and set a phase adjustment amount that is applied to the plurality of branched lights handled by the light emitting unit such that the estimated phase shift amount decreases.

6. The optical scanner according to claim 5, wherein:
the light-guide unit includes a plurality of waveguides; and
the plurality of waveguides are set such that at least either of an incident angle of adjusted light guided by the waveguide to the light receiving unit and a wavefront of the adjusted light differs.

7. The optical scanner according to claim 6, wherein:
the light-guide unit is configured such that a grating lobe of a light beam formed by the light emitting unit is incident thereon.

8. The optical scanner according to claim 7, wherein:
the light-guide unit is arranged outside an angular range that is subject to scanning by the light emitting unit and outside an angular range that is subject to scanning by the light receiving unit.

9. The optical scanner according to claim 8, wherein:
the light emitting unit and the light receiving unit are mounted on a single common substrate;
the light-receiving-side correcting unit is configured to repeatedly perform calculation of the phase adjustment amount until the estimated value of the phase shift amount is a value within an allowable range that is set in advance and estimate a manner of distortion of the common substrate based on changes in the estimated value of the phase shift amount; and
the light-emitting-side correcting unit is configured to calculate the phase adjustment amount based on the manner of distortion of the common substrate estimated by the light-receiving-side correcting unit.

10. The optical scanner according to claim 9, wherein:
the optical phased array includes
a splitter that is provided in a first end portion of a waveguide array that transmits the plurality of branched lights and is configured to divide light into the plurality of branched lights or combine the plurality of branched lights,
an antenna array that is provided in a second end portion of the waveguide array; and
a phase shifter that is configured to change a phase of light that passes through the waveguide for every waveguide configuring the waveguide array.

11. The optical scanner according to claim 10, wherein:
the optical scanner is configured to use, as a light reception result of the light receiving unit, a light reception result of composite light combined by the splitter.

12. The optical scanner according to claim 10, wherein:
the optical scanner is configured to use, as a light reception result of the light receiving unit, a light reception result of the plurality of branched lights before being combined by the splitter.

13. The optical scanner according to claim 1, wherein:
the reference light irradiating unit is arranged outside an angular range that is scanned by the light receiving unit.

14. The optical scanner according to claim 1, wherein:
the light-receiving-side correcting unit is configured to repeatedly perform calculation of the phase adjustment amount until an estimated value of the phase shift amount becomes a value within an allowable range that is set in advance and estimate a manner of distortion of the substrate on which the light receiving unit is mounted based on changes in the estimated value of the phase shift amount.

15. The optical scanner according to claim 1, further comprising:
a light emitting unit that has the optical phased array that is separate from that of the light receiving unit;
a light-guide unit that is configured to guide light that is irradiated from the light emitting unit such that the light is incident on the light receiving unit; and
a light-emitting-side correcting unit that is configured to estimate the phase shift amount of the plurality of branched lights belonging to the light emitting unit that occurs as a result of distortion of the substrate on which the light emitting unit is mounted from the detection result of the light receiving unit onto which the light guided by the light-guide unit is incident, and set a phase adjustment amount that is applied to the plurality of branched lights handled by the light emitting unit such that the estimated phase shift amount decreases.

16. The optical scanner according to claim 15, wherein:
the light-guide unit includes a plurality of waveguides; and
the plurality of waveguides are set such that at least either of an incident angle of adjusted light guided by the waveguide to the light receiving unit and a wavefront of the adjusted light differs.

17. The optical scanner according to claim 15, wherein:
the light-guide unit is configured such that a grating lobe of a light beam formed by the light emitting unit is incident thereon.

18. The optical scanner according to claim 15, wherein:
the light-guide unit is arranged outside an angular range that is subject to scanning by the light emitting unit and outside an angular range that is subject to scanning by the light receiving unit.

19. The optical scanner according to claim 15, wherein:
the light emitting unit and the light receiving unit are mounted on a single common substrate;
the light-receiving-side correcting unit is configured to repeatedly perform calculation of the phase adjustment amount until the estimated value of the phase shift amount is a value within an allowable range that is set in advance and estimate a manner of distortion of the common substrate based on changes in the estimated value of the phase shift amount; and
the light-emitting-side correcting unit is configured to calculate the phase adjustment amount based on the manner of distortion of the common substrate estimated by the light-receiving-side correcting unit.

20. The optical scanner according to claim 1, wherein:
the optical phased array includes a splitter that is provided in a first end portion of a waveguide array that transmits the plurality of branched lights and is configured to divide light into the plurality of branched lights or combine the plurality of branched lights,
an antenna array that is provided in a second end portion of the waveguide array; and
a phase shifter that is configured to change a phase of light that passes through the waveguide for every waveguide configuring the waveguide array.

* * * * *